(12) United States Patent
Kroekenstoel et al.

(10) Patent No.: US 9,819,276 B2
(45) Date of Patent: Nov. 14, 2017

(54) POWER SUPPLY CIRCUIT USING DC/DC CONVERTER

(71) Applicant: NXP B.V., Eindhoven (NL)

(72) Inventors: Dave Kroekenstoel, Geldrop (NL); Steven Thoen, Leuven (BE)

(73) Assignee: NXP B.V., Eindhoven (NL)

( * ) Notice: Subject to any disclaimer, the term of this patent is extended or adjusted under 35 U.S.C. 154(b) by 745 days.

(21) Appl. No.: 13/955,257

(22) Filed: Jul. 31, 2013

(65) Prior Publication Data

US 2014/0043864 A1 Feb. 13, 2014

(30) Foreign Application Priority Data

Aug. 9, 2012 (EP) ..................... 12179964

(51) Int. Cl.
*H02M 3/07* (2006.01)
*H02M 3/335* (2006.01)
*H02M 3/156* (2006.01)
*H04R 25/00* (2006.01)

(52) U.S. Cl.
CPC ......... *H02M 3/33569* (2013.01); *H02M 3/07* (2013.01); *H02M 3/156* (2013.01); *H04B 2215/069* (2013.01); *H04R 25/00* (2013.01)

(58) Field of Classification Search
CPC .... H02M 3/156; H02M 3/33569; H02M 3/07; H04B 1/16; H04B 2215/069; H04R 25/00
USPC ............... 323/282–285; 327/536; 363/59–61
See application file for complete search history.

(56) References Cited

U.S. PATENT DOCUMENTS

| | | | |
|---|---|---|---|
| 6,031,743 A * | 2/2000 | Carpenter et al. | 363/65 |
| 6,198,645 B1 | 3/2001 | Kotowski | |
| 6,411,531 B1 | 6/2002 | Nork et al. | |
| 2005/0280402 A1 | 12/2005 | Nitta et al. | |
| 2009/0160414 A1 | 6/2009 | Hachiya et al. | |
| 2010/0188170 A1* | 7/2010 | Kroekenstoel et al. | 333/175 |
| 2013/0129126 A1* | 5/2013 | Callias et al. | 381/315 |

FOREIGN PATENT DOCUMENTS

| | | |
|---|---|---|
| EP | 0 902 547 A2 | 3/1999 |
| WO | 2011/131241 A1 | 10/2011 |

OTHER PUBLICATIONS

Lee, W. et al, "Battery Ripple Current Reduction in a Three Phase Interleaved DC-DC Converter for 5 kW Battery Charger", IEEE Proc. ECCE, pp. 3535-3540 (Sep. 2011).
Extended European Search Report for European Patent Appln. No. 12179964.7 (dated Mar. 20, 2013).
EP Communication dated Oct. 15, 2015 for Appl. No. 12 179 964.7.

* cited by examiner

*Primary Examiner* — Kyle J Moody (57) ABSTRACT

A power supply circuit comprises an input for receiving a power supply from a battery and a DC/DC converter for supplying a converted voltage to a load. A regulator is used for controlling the DC/DC converter such that the current drawn from the converter is smoothed. A charge storage device at the output of the DC/DC converter enables delivery of a non-constant current to the load.

12 Claims, 11 Drawing Sheets

POWER SUPPLY CIRCUIT USING DC/DC CONVERTER

CROSS-REFERENCE TO RELATED APPLICATIONS

This application claims the priority under 35 U.S.C. §119 of European patent application no. 12179964.7, filed on Aug. 9, 2012, the contents of which are incorporated by reference herein.

This invention relates to power supply circuits which use DC/DC converter circuits, in particular capacitive DC/DC converter circuits. Such circuits are for example used in battery operated devices, in which the DC/DC converter powers the device from the battery.

A hearing aid is for example supplied by a zinc-air battery. Capacitive DC/DC conversion is used to provide the required supply voltage for the hearing aid circuitry. The converter provides a regulated output voltage.

The DC/DC converter typically comprises a switch mode power supply having a clock gating control loop. The converter is clocked when energy is required.

Figure 1:
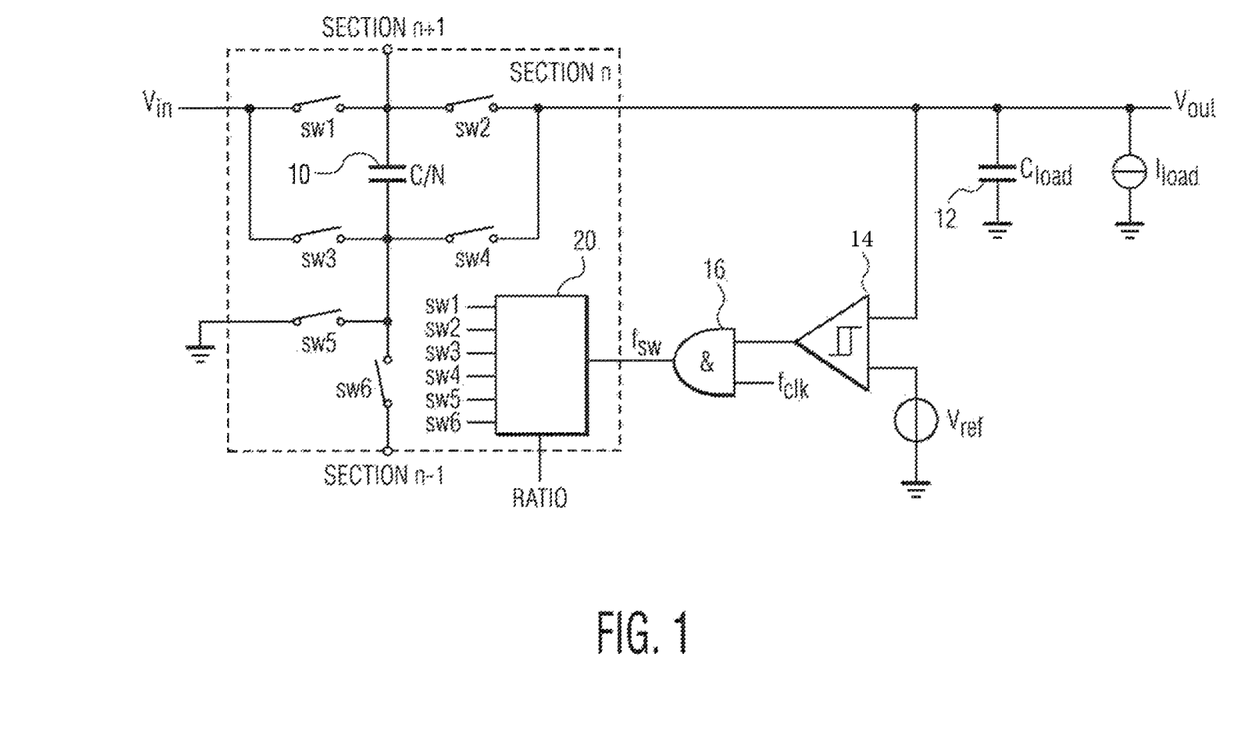
FIG. 1 shows an example of DC/DC converter which can be used by a device having the monitoring circuit and method of the invention.

FIG. 1 shows an example of the DC/DC converter circuit used.

The circuit is supplied by a battery with voltage Vin. A set of switches sw1 to sw6 and a switching capacitor 10 form the core of the DC/DC converter, and generate an output voltage Vout.

The switches control the transfer of charge to and from the capacitor 10. The capacitor is charged using charge flow from the input Vin and discharges to an output capacitor 12 (Cload). In this way, a voltage change as well as voltage regulation can be implemented.

The output voltage Vout (or a voltage derived from it) is compared with a reference voltage Vref by comparator 14 which determines when the switches need to operate. The reference voltage can for example be generated by a bandgap reference circuit. The output voltage Vout can be scaled using a resistive divider for comparison with the bandgap reference voltage.

A clock signal fclk is passed to the switches of the DC/DC converter core (shown schematically in FIG. 1) only when enabled by the comparator 14. The comparator output and the clock signal fclk are provided to an AND gate 16 to derive the clock gating signal fsw. This is used to control all of the switches to provide the desired configuration of the capacitor.

In the case of a battery supply driving a digital core, Vin=Vbat and Vout=Vcore.

The converter is operated in two phases, in which the switching capacitors are connected differently to or between the input voltage, the output voltage or ground. Various ratios can be implemented between the input and output by using capacitors in different configurations.

In a simplest implementation, the DC/DC converter can have a single capacitor (as in FIG. 1) but it can instead have multiple capacitors to enable different ratios to be implemented.

Figure 2:
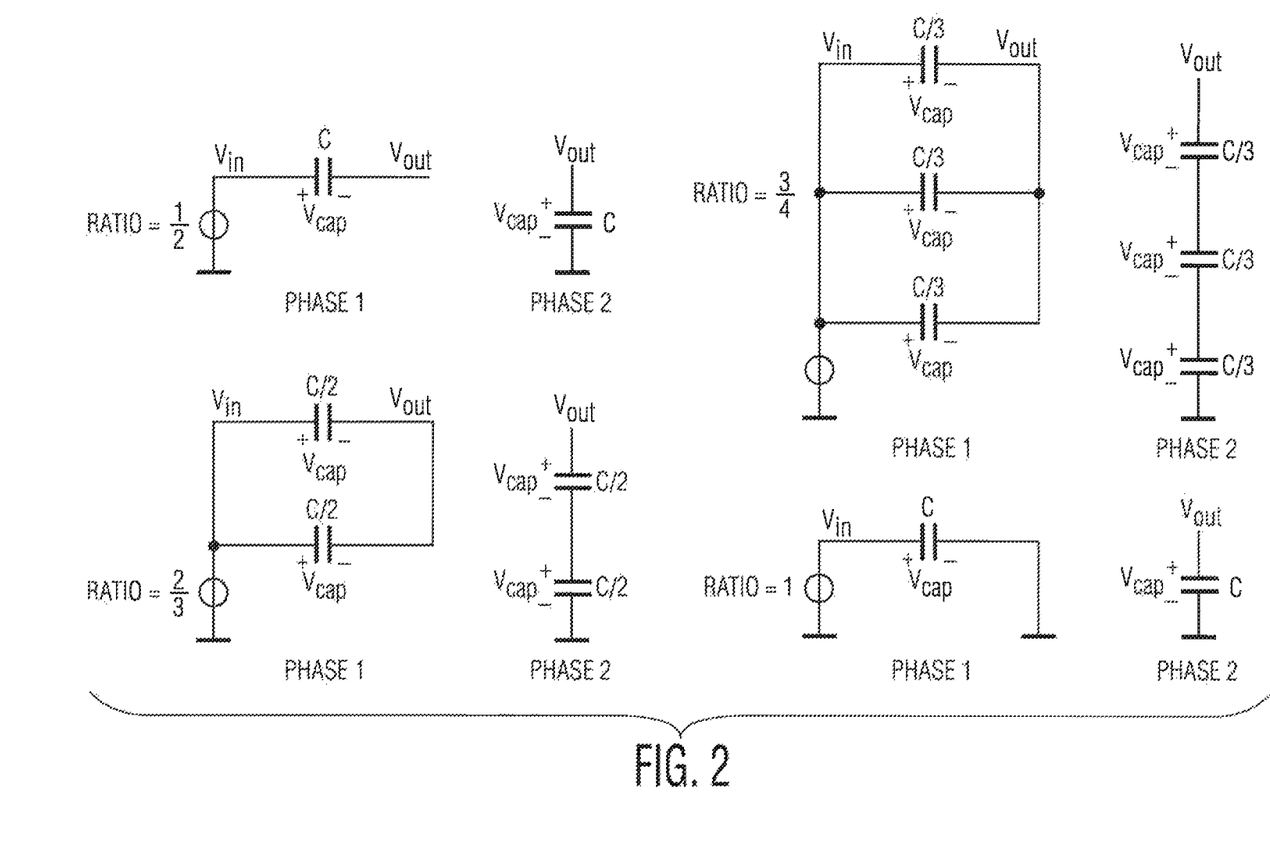
FIG. 2 shows the capacitor configurations for various conversion ratios.

FIG. 2 shows different capacitor configurations in the two phases to implement a selection of different ratios. Capacitor configurations for example ratios 1/2, 3/4, 2/3 and 1 are shown.

A DC/DC converter can be configurable to different ratios by having a suitable capacitor and switch network, so that the switches can implement different capacitor configurations. In the examples of FIG. 2, the ratio is 1 or less, so that the DC/DC converter is down-converting the battery voltage. Charge pump DC/DC converters can also increase the voltage.

Figure 3:
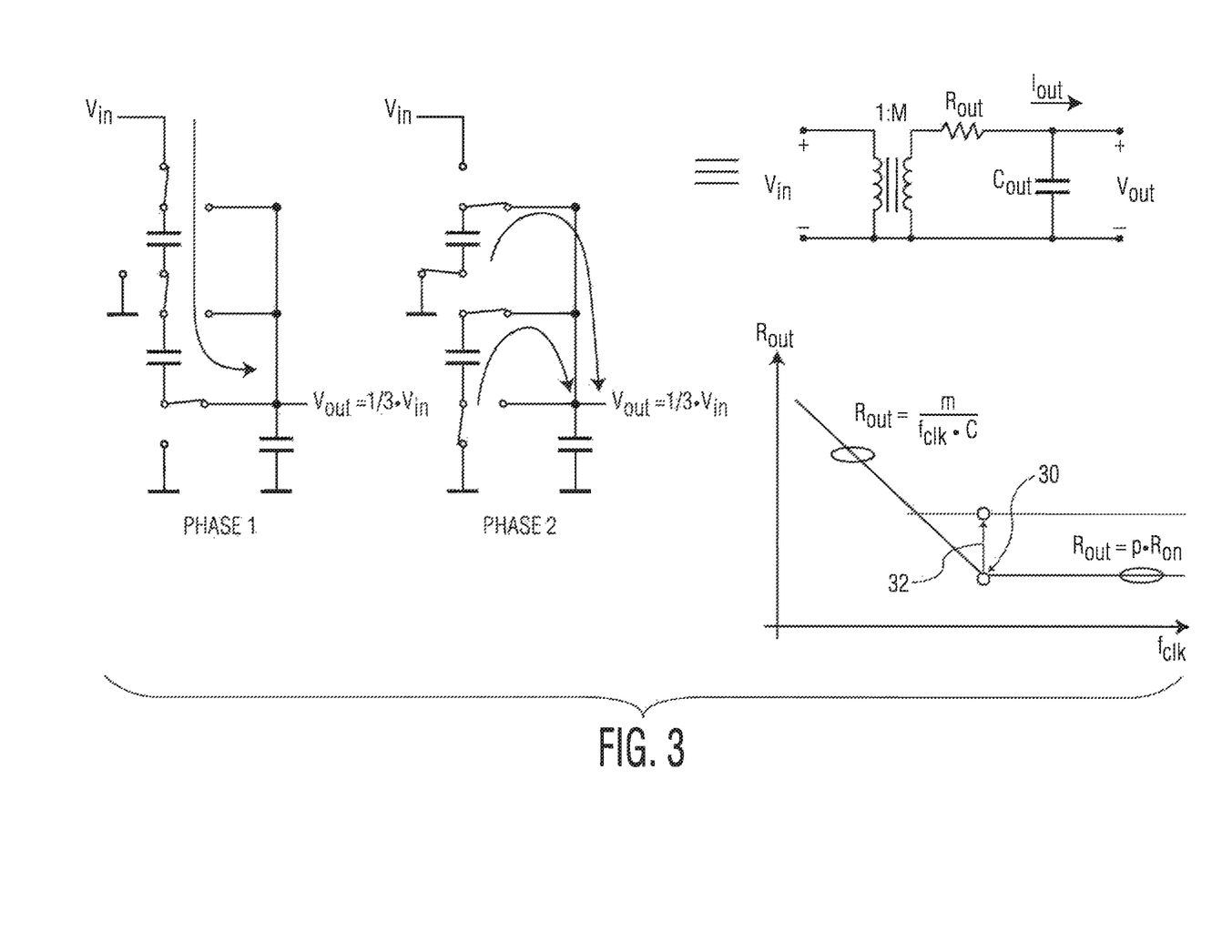
FIG. 3 shows the characteristics of the converter for one particular conversion ratio.

FIG. 3 is used to explain the performance of the circuit, for a ratio of 1/3.

The capacitor configurations are shown in the two phases. An equivalent circuit is shown, with the conversion ratio given more generally as M. The DC/DC converter is represented by a transformer with ratio 1:M and an output RC filter with series output resistance Rout and parallel output capacitance Gout.

In order to obtain the desired output voltage, a switch setting (corresponding to a fixed ratio M) is provided which enables a greater output voltage to be obtained. This is then reduced so that the output voltage reaches the desired level. This can be achieved by regulating the resistance Rout. In practice, the resistor $R_{out}$ is regulated by changing the frequency in a clock gating DC/DC converter. The value M (determined by the fixed ratio corresponding to a particular capacitor configuration) should be chosen in such a way that the output resistance $R_{out}$ consumes the least power.

The graph in FIG. 3 shows how the output resistance Rout is modulated by frequency.

As the clocking frequency increases, the output resistance decreases linearly. However, a lower limit is reached at point 30 at which the on-resistance of the circuit switches becomes dominant. The most efficient operation is at point 30. To change the resistance Rout at frequencies higher than this most efficient clocking frequency, the on resistance of the switches can be modulated, as shown by arrow 32.

Figure 4:
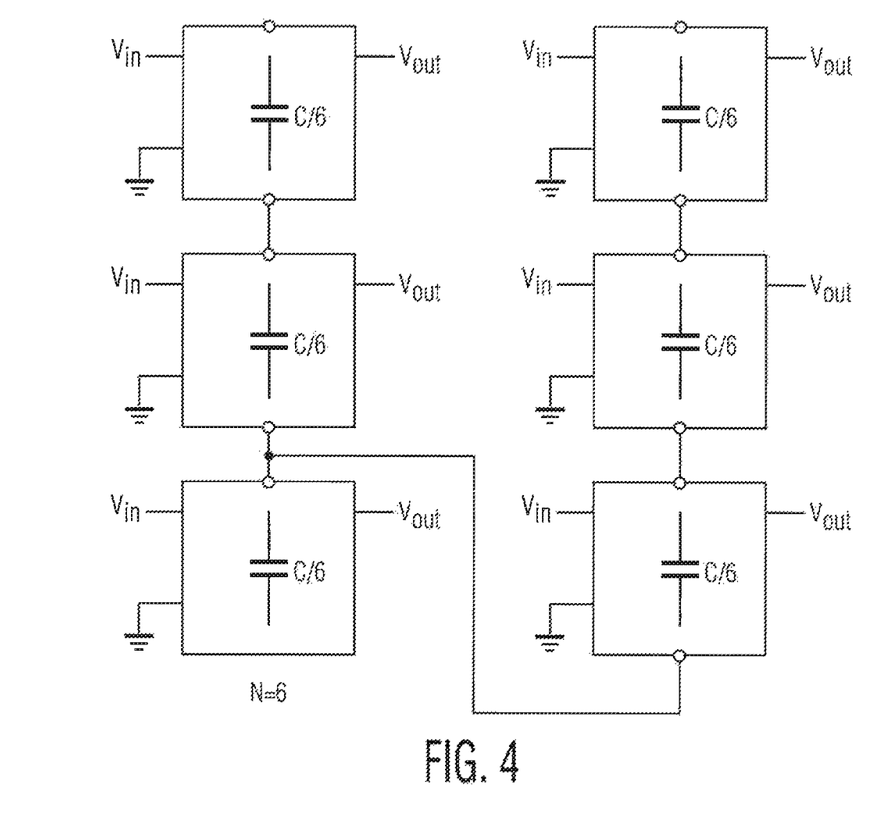
FIG. 4 shows a circuit using six of the modules of FIG. 1.

FIG. 4 shows an arrangement of 6 modular sections coupled together. With suitable control of the switches, this circuit can implement ratios: 1/2, 2/3, 3/4, 1, 4/3, 3/2, 2. The total capacitance in this example is C. This arrangement can be scaled for different load current by using the modular approach and adding sections when more current is needed.

FIG. 5 shows how this modular approach can be used by having multiple capacitor modules 50 that can be switched in or out of circuit during DC/DC operation.

Figure 5A:
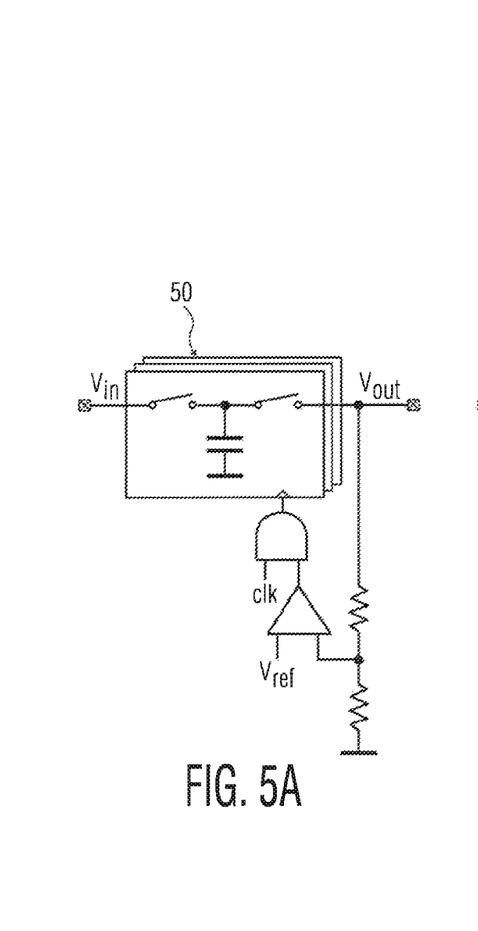
FIG. 5 shows different ways in which a modular approach with multiple capacitor core sections can be used to generate multiple output voltages and swap up- and down conversion re-using the same circuits.

FIG. 5(a) shows the feedback path from the output to a set of capacitor cores 50. The number of cores in use determines the switching capacitance, and this then determines the overall value of Rout, in the same way as can be achieved with clock gating.

Figure 5B:
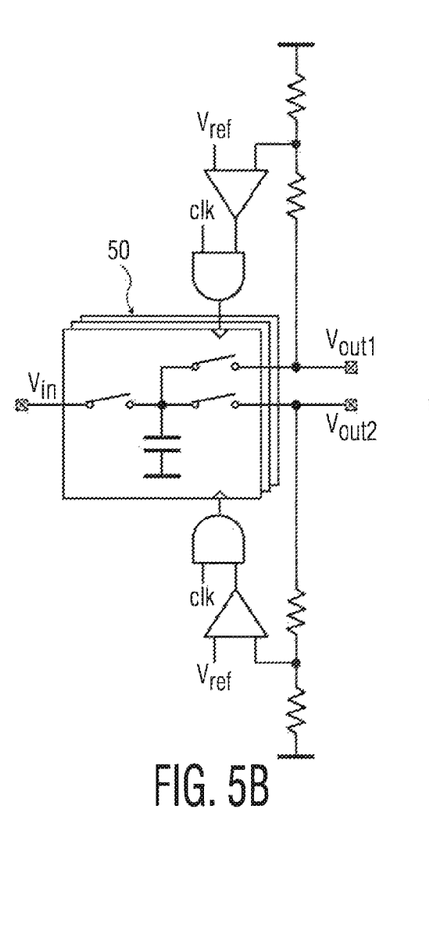

FIG. 5(b) shows an alternative way of using the modular approach in which each capacitor core 50 can be switched to multiple outputs. This can be done in a constant way so that a certain amount of capacitance is always associated with the same output, and the selection of output thus implements the change in Rout. Alternative, the switching can be in a dynamic way so that the total amount of capacitance switched to the different outputs is time-multiplexed.

Figure 5C:
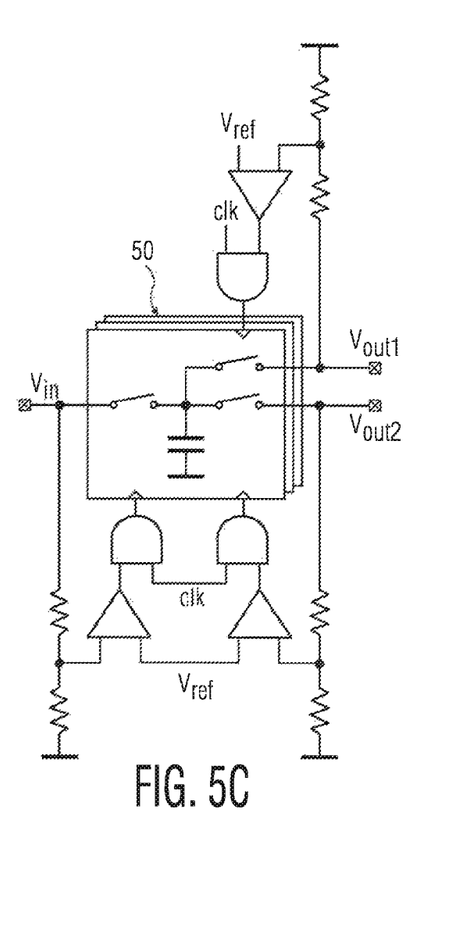

FIG. 5(c) shows a third approach in which the input and output nodes can be swapped. In this way the circuit can be switched between up-conversion and down conversion using the same core sections. Each output will have its own regulation loop.

A problem with DC/DC converters is that sub-blocks are enabled only when needed, in order to minimize current consumption. For example, wireless communication is carried out in bursts. This causes large ripple on the battery and reduces performance. The DC-DC converter is designed to meet output requirements determined by the load to be driven by the output, for example an IC. However, additional analogue circuitry can be supplied directly by the battery, and the ripple on the battery voltage influences the performance of those analogue components. For example in the hearing aid application mentioned above, this results in audible noise on the speaker, when the speaker driver is powered directly by the battery. This is particular a problem because the output impedance of the battery increases during its lifetime. The result is that the useable lifetime of the battery reduces.

According to the invention, there is provided an apparatus and method as defined in the independent claims.

According to one aspect, the invention provides a power supply circuit, comprising:

an input for receiving a power supply from a battery;
a DC/DC converter for supplying a converted voltage to a load;
a regulator for controlling the DC/DC converter to reduce a ripple in the current drawn from the converter; and
a charge storage device at the output of the DC/DC converter for delivering a non-constant current to the load.

The regulator makes the current more constant, and can in theory result in a constant current. However due to practical limitations some remaining ripple will be present in the output current. It is preferred that this ripple is reduced to less than 10% (i.e. the difference between a maximum current and the average current is less than 10% of the average current, and the difference between a minimum current and the average current is less than 10% of the average current). More preferably, this ripple is less than 5%.

By smoothing the output current of the DC/DC converter, the invention can be considered to provide modulation of the output impedance of the capacitive DC/DC converter. In this way, the battery current ripple (and also the battery voltage ripple) can be reduced and even cancelled. The charge storage device enables the output load to draw a burst mode current even though the output of the DC/DC converter is more constant. Thus, the ripple in the current supply to the load (from the charge storage device) is greater than the ripple in the current output from the DC/DC converter.

The charge storage device can comprise an output capacitor connected between the output of the converter unit and a reference line.

In a first example, the regulator can comprise a current mirror circuit at the output of the DC/DC converter which is fed by a current source. This forces the output current to be constant.

In a second example, the regulator comprise a controller for controlling an output resistance of the DC/DC converter. This control can be based on the DC/DC converter unit switching frequency and/or the DC/DC converter unit capacitance.

The invention also provides an electronic device comprising:

a battery;
a circuit of the invention;
a first circuit powered by the DC/DC converter; and
a second circuit powered directly by the battery.

By reducing ripple on the battery current and voltage waveforms, the battery supply to the second circuit is more reliable. The first circuit can comprise an integrated circuit (for example a transceiver) and the second circuit can comprise an analogue circuit (for example a loudspeaker and microphone drive circuit).

In another aspect, the invention provides a power supply method, comprising:

receiving a power supply from a battery;
using a DC/DC converter to supply a converted voltage to a load;
controlling the DC/DC converter to reduce a ripple in the current drawn from the converter; and
using a charge storage device at the output of the DC/DC converter to deliver a non-constant current to the load.

Examples of the invention will now be described in detail with reference to the accompanying drawings, in which.

The invention relates to a power supply circuit which receives a power supply from a battery and has a DC/DC converter for supplying a converted voltage (i.e. a DC regulated voltage) to a load. A regulator is used for controlling the DC/DC converter such that the current drawn from the converter is smoothed, for example so that it is substantially constant.

This reduces the resulting ripple on the battery output voltage. A charge storage device at the output of the DC/DC converter enables delivery of a non-constant current to the load.

Before describing the invention in detail, the problems associated with the known circuit arrangement will first be discussed.

Figure 6:
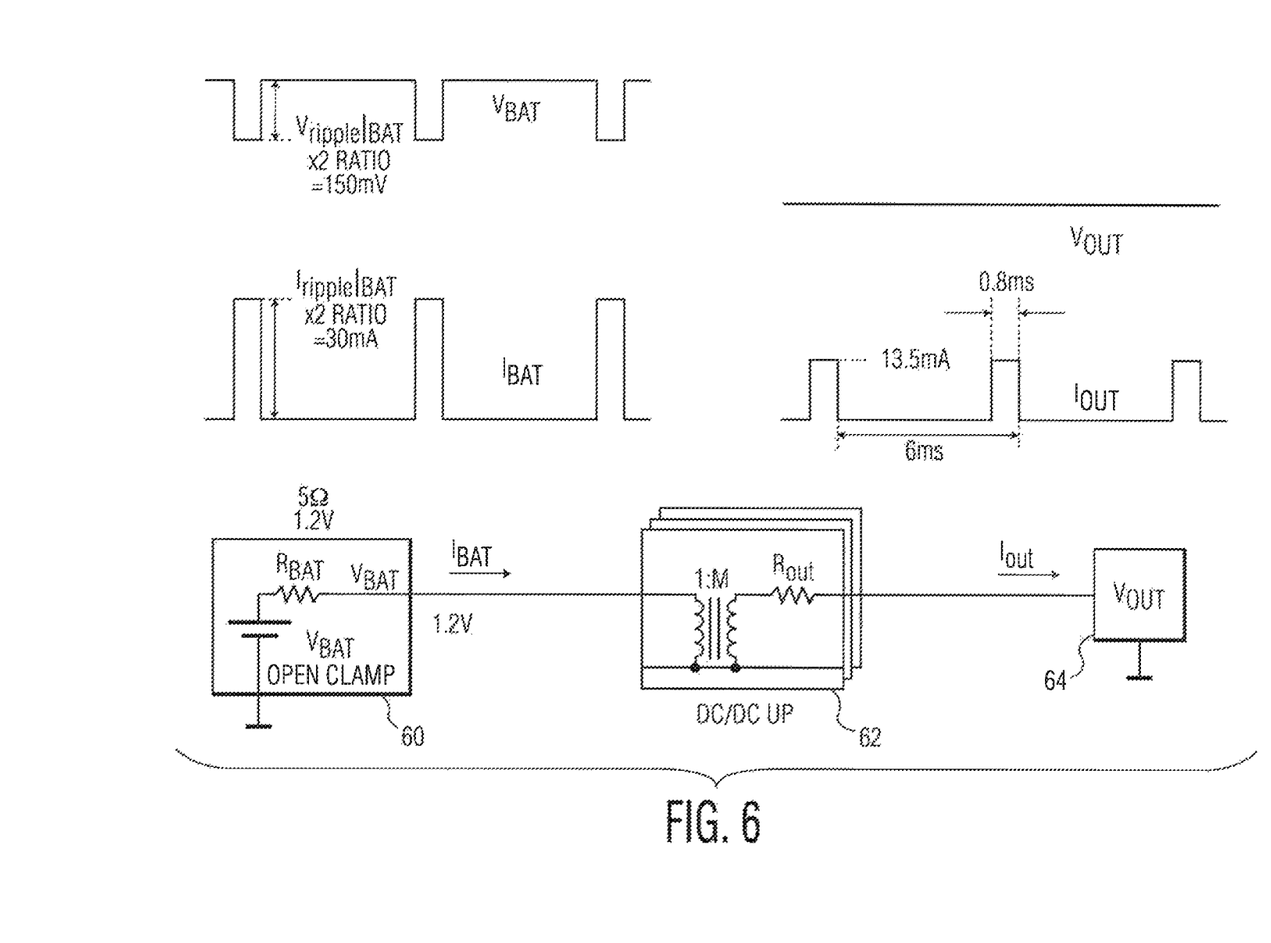
FIG. 6 shows the circuit diagram of a DC/DC converter connected to a load, and shows the timing diagrams to illustrate performance issues.

FIG. 6 shows the equivalent circuit and the various voltage and currents flowing when the DC/DC converter is used to drive an IC 64, which for example can be a 2.4 GHz transceiver circuit.

The circuit comprises the battery 60, the DC-DC converter 62 and the load 64 to be driven by the converter output, for example a digital integrated circuit (IC). The IC requires a particular voltage range. For example, a battery voltage of 1.2V can be converted to a value which must always be higher than 1.8V, for example in the range 2V to 3V.

The IC has a known current demand. The example shows a peak current $I_{OUT}$ of 13.5 mA for a duration of 0.8 ms, with a period of 6 ms. This current spike can be the burst mode of a transceiver.

The current spike in the battery output is a multiple of the output current spike as a result of the converter amplification. For example, the fluctuation in the battery current $I_{BAT}$ on the input side of the converter 62 can be approximately 30 mA as shown, based on a converter ratio of 2. With a battery impedance of 50 this corresponds to a spike in the battery voltage $V_{BAT}$ of 150 mV.

Figure 7:
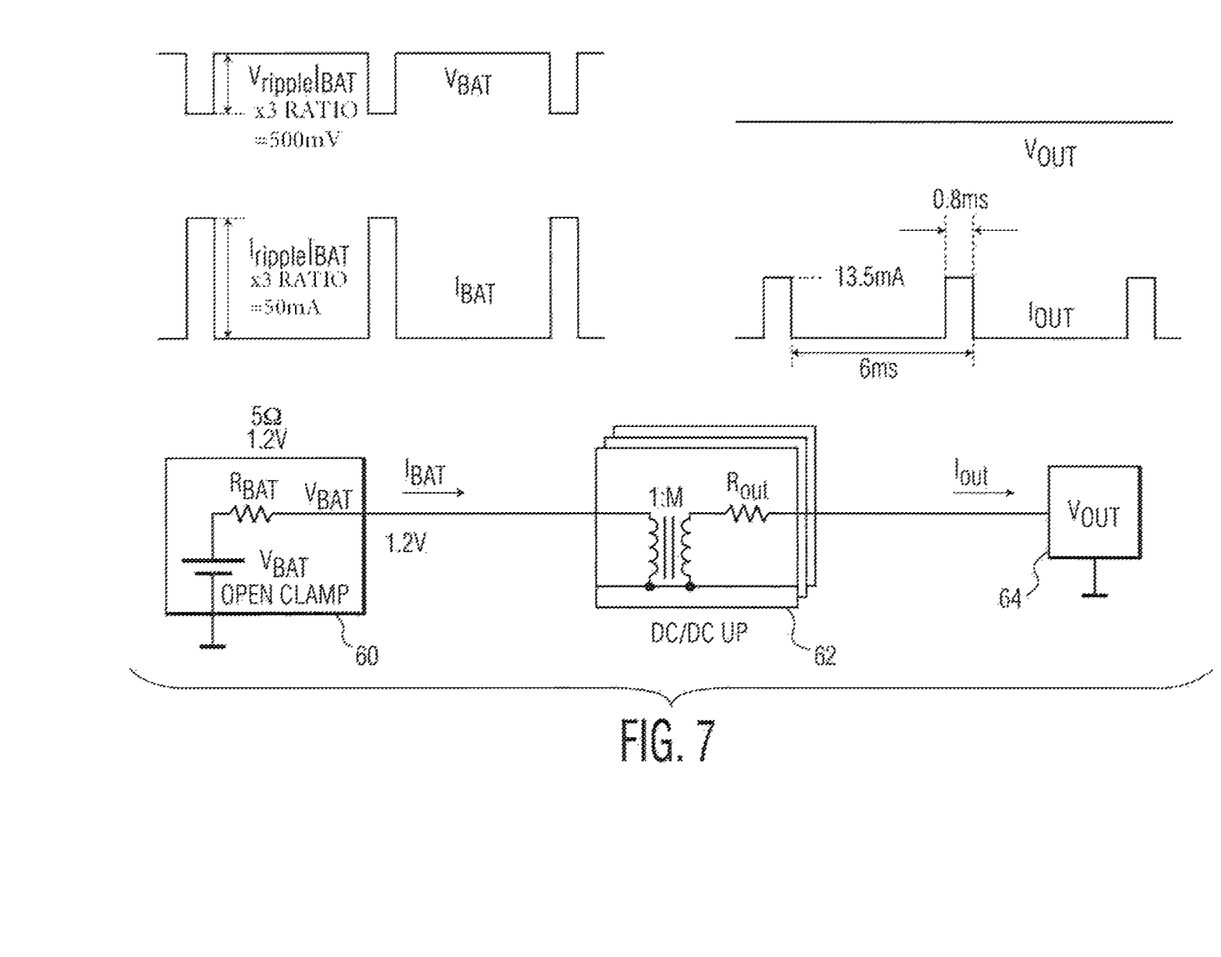
FIG. 7 shows how the problems with the circuit of FIG. 6 are worse when the battery ages.

As the battery ages, the voltage decreases and the impedance increases. For example the voltage can drop to 1.0V and the impedance can increase to 10Ω.

FIG. 7 shows the effect on the battery supply. The current ripple increases to 50 mA based on a conversion ratio of 3, and the corresponding voltage ripple in $V_{BAT}$ increases to 500 mV. This voltage ripple can make the battery output unsuitable for use in powering other devices and it can result in audible noise when used to power a loudspeaker.

Figure 8:
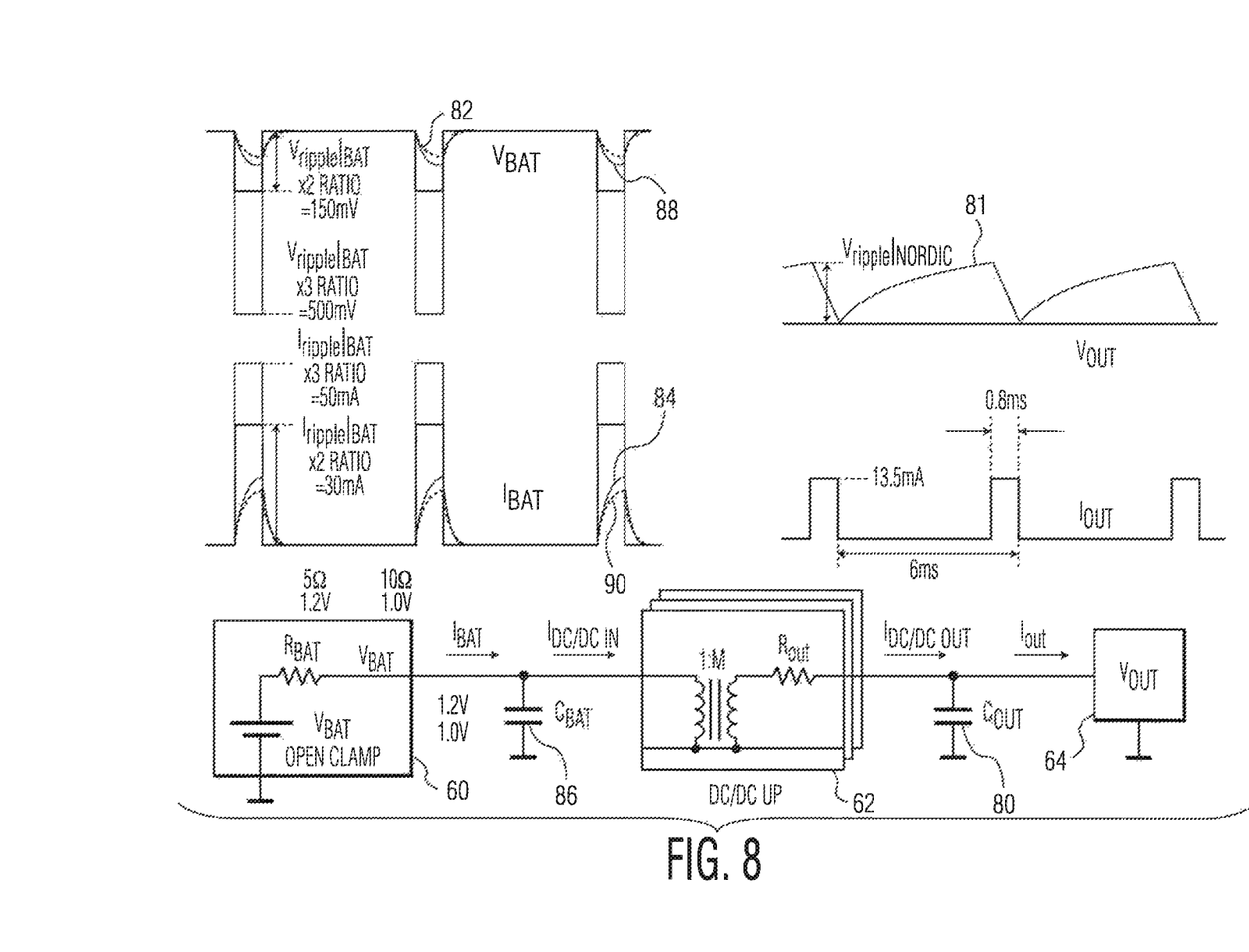
FIG. 8 shows how the addition of capacitances can reduce the problems.

A first way to reduce these ripples is to add an output capacitor 80 between the output $V_{OUT}$ and ground as shown in FIG. 8.

This reshapes the output voltage $V_{OUT}$ to have a ripple, as shown as plot 81 in FIG. 8. The output capacitor can have a value of around 10 uF, and it combines with Rout to form a low pass filter that filters the ripple at Vout. The output current $I_{OUT}$ is thus partly supplied from the capacitor $C_{OUT}$. This means $R_{out}$ can made more high-ohmic by reducing the size of the switching capacitor (which for example may be of the order of 6 nF) and/or $f_{clk}$ in the DC/DC converter.

The reduced ripple in the battery voltage and current is shown as plots 82 and 84. However, the output capacitor takes up area, and the improvement is limited.

A further improvement can be obtained by adding a capacitor 86 to the battery output. This is an additional capacitor that is placed in parallel with the battery to further provide battery ripple reduction. The output voltage $V_{OUT}$ is not changed further but the voltage and current ripple for the battery are reduced further as shown by plots 88,90, However, placing a limited size capacitor at that location does not improve the ripple significantly.

Figure 9:
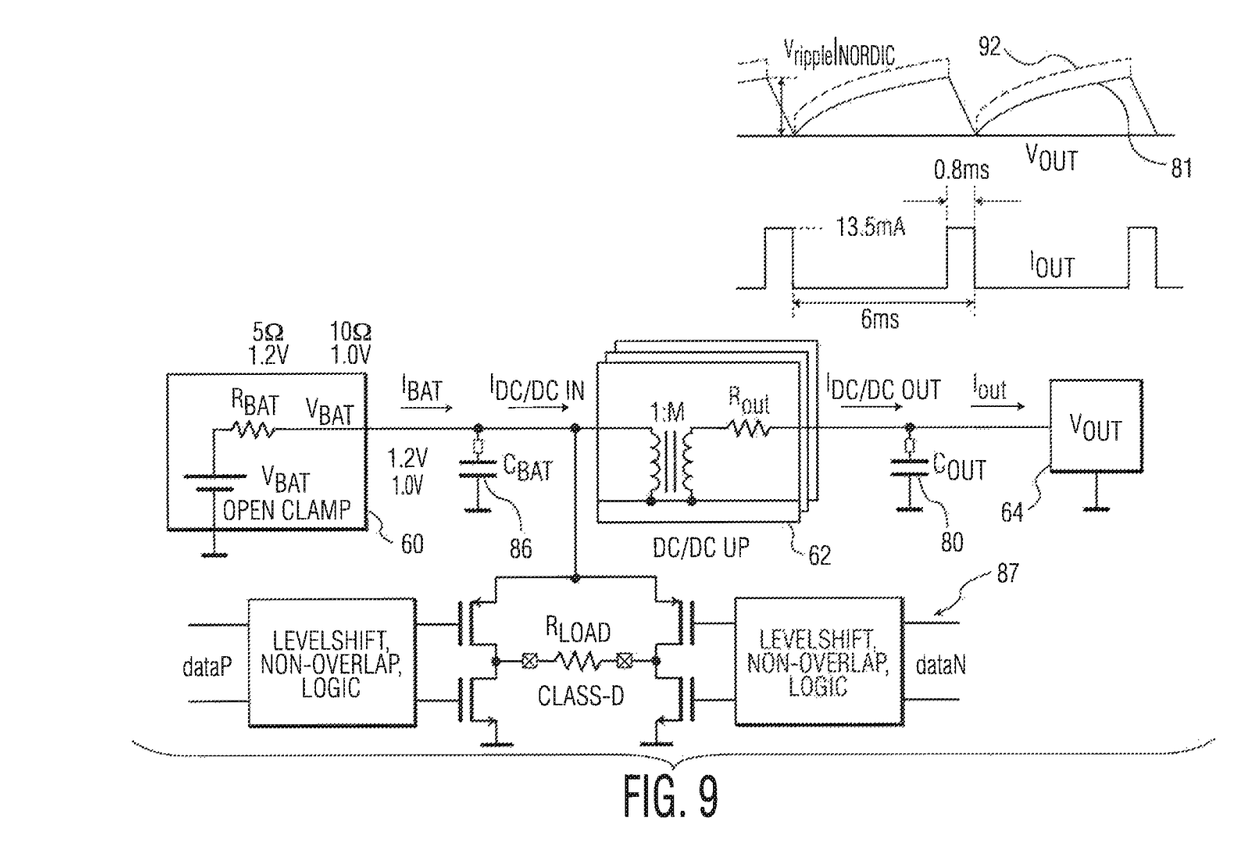
FIG. 9 shows how the battery voltage is used directly to power some circuits.

FIG. 9 shows resistors in series with the two additional capacitors 80,86. These are parasitic resistances, and they have the effect of increasing the ripple on the output voltage $V_{OUT}$ as shown by plot 92.

FIG. 9 also shows that the battery voltage output can be used to power analogue circuits, such as a class D amplifier 87 as shown.

The problem remains that it is very difficult to achieve a low ripple on the battery, assuming that large external capacitors are to be avoided, for example because they may be too large with respect to the area inside a hearing aid.

The ripple on the battery voltage depends on the supply drop allowed on $V_{OUT}$, the capacitance value that can be used in the application, the battery impedance $R_{BAT}$, and the equivalent series resistance (ESR) of the chosen external capacitors. The on time $T_{ON}$ (0.8 ms in the example given) determines the maximum current the DC/DC converter needs to deliver and the minimum permitted battery voltage.

Simulations show that the ripple on the battery voltage $V_{BAT}$ is mainly determined by the battery resistance $R_{BAT}$ and the low-pass filtered output current pulse as seen at the input of the DC/DC converter. As explained above, this filtered current pulse is multiplied by the battery resistance Rbat to derive the voltage ripple at the battery.

The mean current that needs to be delivered determines the DC/DC converter output resistance $R_{OUT}$, and therefore a certain value of $C_{OUT}$ can be found that provides sufficient filtering of the current pulse multiplied with the battery resistance $R_{BAT}$. Thus, there is a trade-off between $C_{OUT}$ and $R_{BAT}$.

By way of example, a simulation shows that the described 800 us on-time in 6 ms intervals is possible with use of a 10 uF external capacitor $C_{OUT}$. Assuming $V_{BAT}$=1.2V, $R_{BAT}$=5Ω, this results in <100 mV supply dips at the Zn-Air battery and 600 mV supply dips at $V_{OUT}$.

$V_{OUT}$ should be charged to more than 2.4V as a result of this 600 mV ripple.

For lower peak voltages, the <100 mV ripple can be kept on $V_{BAT}$ by choosing an increased ratio and larger $C_{DC/DC}$, but an increase in $R_{BAT}$ will cause a larger ripple. As explained above, a larger ripple on the battery causes significant performance reduction.

The invention provides a power supply circuit which is supplied by a battery and which has a DC/DC converter for supplying a DC regulated voltage to a load. A current regulator controls the current drawn from the DC/DC converter to be constant (in an ideal implementation). This means an input current ripple is avoided, and the battery output voltage is stabilised, so that other circuits can be powered directly by the battery. A charge storage device at the output of the DC/DC converter enables a non-constant current to be supplied to the load, based on the demand presented by the load.

Figure 10:
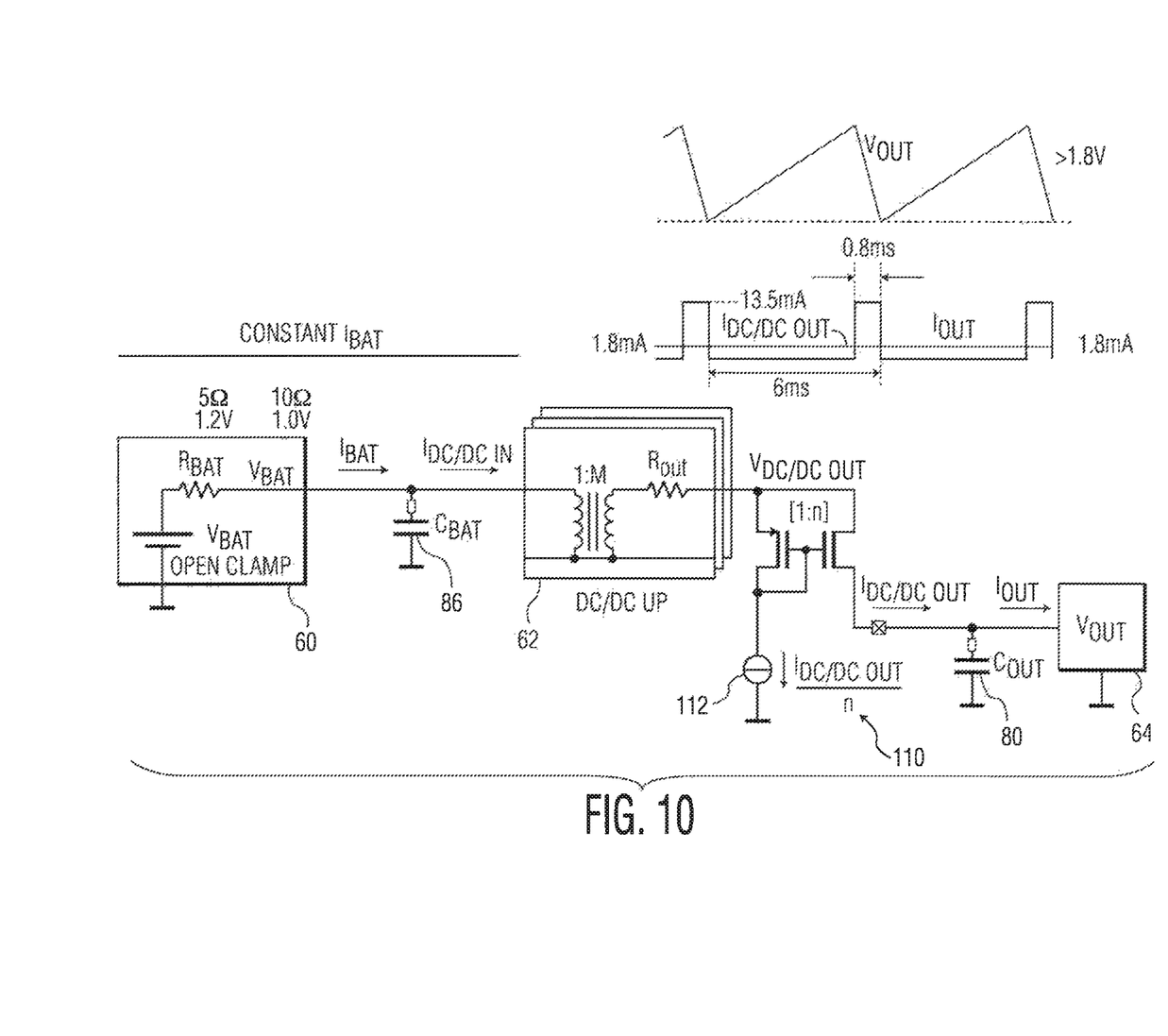
FIG. 10 shows a first example of converter circuit of the invention.

FIG. 10 shows a first example of DC/DC converter circuit of the invention in which a current mirror is provided at the output of the DC/DC converter to ensure a constant battery current. This current mirror thus provides the regulation function.

The circuit comprises the battery 60, the optional battery capacitor 86 to help filtering the voltage ripple at $V_{BAT}$, and the DC/DC converter 62. The load IC 64 is shown as well as the external capacitor 80 placed at the output of the DC/DC converter 62. The parasitic resistances are also shown, to illustrate that they do not prevent the correct operation of the invention.

The current mirror circuit 110 comprises a first branch which is fed by a reference current source 112. The current mirror multiplies the reference current by a factor of n. This multiplied current is provided as the output current $I_{OUT}$.

The current mirror 110 drives the output capacitor 80 with a constant current equal to the average current consumed by the load 64 (which in the example above is an integrated circuit, for example an RF transceiver IC). The average current consumption of the load is thus used in the design of the circuit components. Assuming a 13.5 mA current consumption during 800 us activation time in a 6 ms interval (as shown above), the average current is 13.5 mA*800 us/6 ms=1.8 mA. This current will charge the output capacitor Cout with a constant current whereas the IC discharges Cout in a pulsed way. Thus, the capacitor Cout functions as a charge reservoir, leading to a triangular ripple at Vout. This triangular ripple on $V_{OUT}$ is shown in FIG. 10. The voltage remains above the minimum threshold at all times, which in this example is given as 1.8V.

The output capacitor may be as small as 10 uF to enable implementation of the invention. However, a larger capacitance, for example 47 uF, makes the ripple on the output voltage Vout smaller, and increases power efficiency.

The IC 64 may not be sensitive to voltage ripple, for example if it contains an on-board voltage regulator. The current mirror implementation is used to set the output current to the average current consumed by the IC 64. A high multiplication factor of n (e.g. n=100) is used, so that the overall current consumption resulting from the use of the current mirror is not increased significantly.

The current mirror current can have a static current setting (which is possible when the average current consumption of the IC is known exactly) or it can operate in a dynamic manner. When dynamically controlled, the output voltage Vout can be monitored, and it can be verified whether or not the minimum value stays above the minimum allowed voltage for the IC.

If the IC consumes more average current, then the voltage Vout will drop over time leading to a functional error. By detecting this, the current coming from the current mirror can be increased, by changing the current of the current source.

The effect of this current mirror circuit can be considered to be a modulation of the output resistance Rout. The modulation is the mathematical result from the fact that the output voltage Vout has a triangular shape and the output current Iout is constant, leading to Rout=Vout/Iout=[triangular shape]/[constant shape]=triangular shape].

The output capacitor 80 is needed to prevent a large ripple at the output of the DC/DC converter. The DC/DC converter basically multiplies the input voltage by a certain constant ratio. Suppose the battery voltage is equal to 1.2V and the ratio is 3×, then the output of the DC/DC will generate 3*1.2V=3.6V each time there is a DC/DC switching cycle.

Although the average charge transfer is regulated by gating the clock, there will be a large ripple at this node. For example, 3.6V can be higher than the maximum voltage allowed by the process limit (which is for example 2.8V).

To reduce this voltage ripple, an external capacitance can be added to the node $V_{DC/DC\ OUT}$. However, this requires an extra pin.

Figure 11:
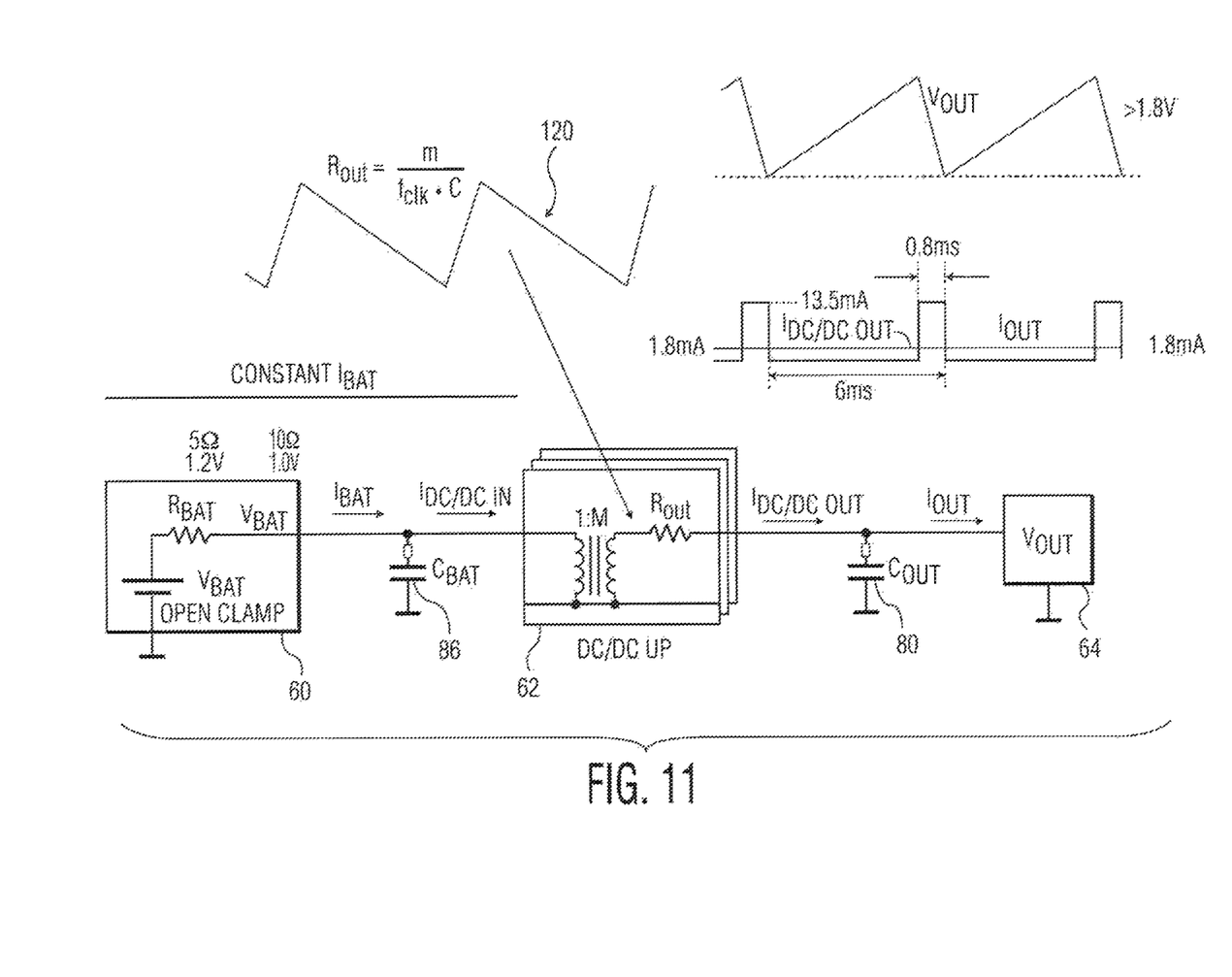
FIG. 11 shows a second example of converter circuit of the invention.

FIG. 11 shows a second example of DC/DC converter circuit of the invention in which the output resistance of the DC/DC converter is modulated using frequency control to provide a constant battery current. This avoids the need for an additional external capacitor mentioned above.

FIG. 11 shows how the output resistance of the DC/DC converter can be varied over time as plot 120 in order to result in the constant current output. As shown in FIG. 3 also, the resistance is inversely proportional to the capacitance and the clock frequency. Thus, by dividing the time interval into segments, for example 20 to 500 segments per conversion cycle, the resistance can be controlled in each segment so that the resistance follows the profile 120.

This approach is possible when it is known in advance when the output load is active and its current profile is known. This information is used to modulate the DC/DC converter output resistance $R_{OLT}$ in such a way that the battery current is constant, by changing either the capacitance inside the capacitive DC/DC converter or its frequency over time.

The circuit of FIG. 11 corresponds to that of FIG. 10 but the DC/DC converter output resistance is modulated as shown instead of providing a current mirror output. Thus, the circuit corresponds to that of FIG. 9 but with modulation of the output resistance. Thus, the current regulator is implemented as a controller for varying the capacitance and/or clocking frequency of the converter.

The circuit functions by varying Rout in such a way that the output voltage Vout has the same triangular shape as in the above case with a current mirror.

By dividing the 6 ms interval into k bins, each will be equal to Tbin=6 ms/k (for k=128, this gives we have Tbin=6 ms/128=46.875 us). In each Tbin a desired constant value for Rout is obtained:

$Rout[k]=m/(fclk[k]*Cswitching[k])$

If the value of k is large enough, the same triangular shape can be emulated as in the above case with a current mirror:

$Iout=Vout/Rout=$[triangular shape]/[triangular shape]=[constant shape]

Of course in practice there are limits to increasing k and there will be some quantization effects remaining. However, overall the ripple on Vbat can be reduced to a large extent.

When requiring changes in capacitance at the different bins, the modular approach explained above can be used to vary the switching capacitance. Thus, the number of converter cores which are switched into circuit can be controlled during the time period. The converter cores can for example have a binary weighted capacitance series so that a large number of different capacitances can be implemented by selection of the converter cores which are operative.

The operation of the circuit has been verified by simulations.

Various modifications will be apparent to those skilled in the art.

The invention claimed is:

1. A power supply circuit, comprising:
    an input for receiving a power supply from a battery;
    a switched capacitor DC/DC converter for supplying a converted voltage to a load;
    a regulator for controlling the switched capacitor DC/DC converter to reduce a ripple in the current drawn from the switched capacitor DC/DC converter; and
    a charge storage device at an output of the switched capacitor DC/DC converter for delivering a non-constant current to the load, wherein the regulator comprises a controller configured to control an output resistance of the switched capacitor DC/DC converter by either adjusting a switching frequency or a capacitance of the switched capacitor DC/DC converter.

2. The power supply circuit as claimed in claim 1, wherein the regulator ensures the ripple in the current drawn from the converter is less than 10% of an average current drawn.

3. The power supply circuit as claimed in claim 1, wherein the charge storage device comprises:
    an output capacitor connected between the output of the switched capacitor DC/DC converter and a reference line.

4. The power supply circuit as claimed in any preceding claim, wherein the regulator comprises a current mirror circuit at the output of the switched capacitor DC/DC converter which is fed by a current source.

5. An electronic device comprising:
    the battery;
    the power supply circuit as claimed in claim 1;
    a first circuit powered by the switched capacitor DC/DC converter; and
    a second circuit powered directly by the battery.

6. The device as claimed in claim 5, wherein the first circuit comprises a digital integrated circuit and the second circuit comprises an analog circuit.

7. The device as claimed in claim 6 comprising a hearing aid, wherein the digital integrated circuit comprises a transceiver circuit.

8. The device as claimed in claim 7, comprising the hearing aid, wherein the analog circuit comprises a loudspeaker and microphone drive circuit.

9. A power supply method, comprising:
    receiving a power supply from a battery;
    using a switched capacitor DC/DC converter to supply a converted voltage to a load;
    controlling the switched capacitor DC/DC converter to reduce a ripple in a current drawn from the switched capacitor DC/DC converter; and
    using a charge storage device at the output of the switched capacitor DC/DC converter to deliver a non-constant current to the load; and controlling an output resistance of the switched capacitor DC/DC converter by either adjusting a switching frequency or a capacitance of the switched capacitor DC/DC converter.

10. The method as claimed in claim 9, wherein the controlling further comprises:

fixing the current drawn from the switched capacitor DC/DC converter using a current source.

11. The method as claimed in claim 9, further comprising:

adjusting the switching frequency to adjust the output resistance of the switched capacitor DC/DC converter.

12. The method as claimed in claim 9, further comprising:

adjusting the capacitance to adjust the output resistance of the switched capacitor DC/DC converter.

\* \* \* \* \*